(12) United States Patent
Kawaguchi et al.

(10) Patent No.: US 6,977,889 B1
(45) Date of Patent: Dec. 20, 2005

(54) CROSS-CONNECT METHOD AND CROSS-CONNECT APPARATUS

(75) Inventors: Mitsuhiro Kawaguchi, Osaka (JP); Shigeo Tani, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/387,949

(22) Filed: Sep. 1, 1999

(30) Foreign Application Priority Data

Dec. 24, 1998 (JP) .................................. 10-368083

(51) Int. Cl.7 ............................................ G01R 31/08
(52) U.S. Cl. ...................... 370/228; 370/224; 370/227
(58) Field of Search ................................ 370/222–224, 370/227, 228, 242, 244, 250, 225, 248, 357, 370/360, 384, 437

(56) References Cited

U.S. PATENT DOCUMENTS 4,388,715 A * 6/1983 Renaudin et al. .......... 370/244
5,495,472 A * 2/1996 Ohara ........................ 370/224
6,034,947 A    3/2000 Yoshida et al.
6,430,150 B1 * 8/2002 Azuma et al. .............. 370/218

FOREIGN PATENT DOCUMENTS

JP    HEI10-28101    1/1998

OTHER PUBLICATIONS

Notice of Rejection dated May 23, 2005.

* cited by examiner

*Primary Examiner*—Chi Pham
*Assistant Examiner*—Ronald Abelson
(74) *Attorney, Agent, or Firm*—Katten Muchin Rosenman LLP

(57) ABSTRACT

There is described a cross-connect apparatus which can apply a cross-connect operation in place of a function of a hard switch that has conventionally been used for a purpose other than a cross-connect operation, by selection of line setting information used for path switching and service selection operations, and by performing a cross-connect operation based on the information, thereby preventing redundant configuration of the cross-connect apparatus and diminishing power consumption.

7 Claims, 11 Drawing Sheets

FIG. 8

| Slot | Ch | 48c | 24c | 12c | 3c |
|---|---|---|---|---|---|
| 1 | 1 | ○ | ○ | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  |  | ↓ | ○ |
|  | 11,12 |  |  |  | ○ |
| 2 | 1 |  |  | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  | ↓ | ↓ | ○ |
|  | 11,12 |  |  |  | ○ |
| 3 | 1 |  | ○ | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  |  | ↓ | ○ |
|  | 11,12 |  |  |  | ○ |
| 4 | 1 |  |  | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 | ↓ | ↓ | ↓ | ○ |
|  | 11,12 |  |  |  | ○ |
| 5 | 1 | ○ | ○ | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  |  |  | ○ |
|  | 11,12 |  |  |  | ○ |
| 6 | 1 |  |  | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  | ↓ | ↓ | ○ |
|  | 11,12 |  |  |  | ○ |
| 7 | 1 |  | ○ | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 |  |  | ↓ | ○ |
|  | 11,12 |  |  |  | ○ |
| 8 | 1 |  |  | ○ | ○ |
|  | 2,3 |  |  |  |  |
|  | 4 |  |  |  | ○ |
|  | 5,6 |  |  |  | ○ |
|  | 7 |  |  |  | ○ |
|  | 8,9 |  |  |  | ○ |
|  | 10 | ↓ | ↓ | ↓ | ○ |
|  | 11,12 |  |  |  | ○ |

| CONCATENATION | | | |
|---|---|---|---|
| [2] | [1] | [0] | Status |
| 0 | 0 | 0 | UNEQ-P |
| 0 | 0 | 1 | STS-1 |
| 0 | 1 | 0 | STS-3c |
| 0 | 1 | 1 | STS-12c |
| 1 | 0 | 0 | STS-24c |
| 1 | 0 | 1 | STS-48c |
| 1 | 1 | 0 | STS-1 |
| 1 | 1 | 1 | STS-1 |

FIG. 9(b)

| CONCATENATION | | | |
|---|---|---|---|
| [2] | [1] | [0] | Status |
| 0 | 0 | 0 | UNEQ-P |
| 0 | 0 | 1 | STS-1 |
| 0 | 1 | 0 | STS-3c |
| 0 | 1 | 1 | STS-12c |
| 1 | 0 | 0 | STS-24c |
| 1 | 0 | 1 | STS-1 |
| 1 | 1 | 0 | STS-1 |
| 1 | 1 | 1 | STS-1 |

FIG. 9(c)

| CONCATENATION | | | |
|---|---|---|---|
| [2] | [1] | [0] | Status |
| 0 | 0 | 0 | UNEQ-P |
| 0 | 0 | 1 | STS-1 |
| 0 | 1 | 0 | STS-3c |
| 0 | 1 | 1 | STS-12c |
| 1 | 0 | 0 | STS-1 |
| 1 | 0 | 1 | STS-1 |
| 1 | 1 | 0 | STS-1 |
| 1 | 1 | 1 | STS-1 |

| CONCATENATION | | | |
|---|---|---|---|
| [2] | [1] | [0] | Status |
| 0 | 0 | 0 | UNEQ-P |
| 0 | 0 | 1 | STS-1 |
| 0 | 1 | 0 | STS-3c |
| 0 | 1 | 1 | STS-1 |
| 1 | 0 | 0 | STS-1 |
| 1 | 0 | 1 | STS-1 |
| 1 | 1 | 0 | STS-1 |
| 1 | 1 | 1 | STS-1 |

FIG. 9(e)

| CONCATENATION | | | |
|---|---|---|---|
| [2] | [1] | [0] | Status |
| 0 | 0 | 0 | UNEQ-P |
| 0 | 0 | 1 | STS-1 |
| 0 | 1 | 0 | STS-1 |
| 0 | 1 | 1 | STS-1 |
| 1 | 0 | 0 | STS-1 |
| 1 | 0 | 1 | STS-1 |
| 1 | 1 | 0 | STS-1 |
| 1 | 1 | 1 | STS-1 |

FIG. 10

| EAST [2] | EAST [1] | EAST [0] | EAST | WEST [2] | WEST [1] | WEST [0] | WEST | PSW SS CONCATENATION OPERATION 48c | 24c | 12c | 3c | STS1 | UNEQ-P |
|---|---|---|---|---|---|---|---|---|---|---|---|---|---|
| 0 | 0 | 0 | UNEQ-P | 0 | 0 | 0 | UNEQ-P |  |  |  |  |  | O |
|  |  |  |  |  |  | 1 | STS-1 |  |  |  |  | O |  |
|  |  |  |  |  | 1 | 0 | STS-3c |  |  |  | O |  |  |
|  |  |  |  |  | 1 | 1 | STS-12c |  |  | O |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  |  |  |  | O |  |
| 0 | 0 | 1 | STS-1 | 0 | 0 | 0 | UNEQ-P |  |  |  |  | O |  |
|  |  |  |  |  |  | 1 | STS-1 |  |  |  |  | O |  |
|  |  |  |  |  | 1 | 0 | STS-3c |  |  |  | O |  |  |
|  |  |  |  |  | 1 | 1 | STS-12c |  |  | O |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  |  |  |  | O |  |
| 0 | 1 | 0 | STS-3c | 0 | 0 | 0 | UNEQ-P |  |  |  | O |  |  |
|  |  |  |  |  |  | 1 | STS-1 |  |  |  | O |  |  |
|  |  |  |  |  | 1 | 0 | STS-3c |  |  |  | O |  |  |
|  |  |  |  |  | 1 | 1 | STS-12c |  |  | O |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  |  |  |  | O |  |
| 0 | 1 | 1 | STS-12c | 0 | 0 | 0 | UNEQ-P |  |  | O |  |  |  |
|  |  |  |  |  |  | 1 | STS-1 |  |  | O |  |  |  |
|  |  |  |  |  | 1 | 0 | STS-3c |  |  | O |  |  |  |
|  |  |  |  |  | 1 | 1 | STS-12c |  |  | O |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  |  | O |  |  |  |
| 1 | 0 | 0 | STS-24c | 0 | 0 | 0 | UNEQ-P |  | O |  |  |  |  |
|  |  |  |  |  |  | 1 | STS-1 |  | O |  |  |  |  |
|  |  |  |  |  | 1 | 0 | STS-3c |  | O |  |  |  |  |
|  |  |  |  |  | 1 | 1 | STS-12c |  | O |  |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  | O |  |  |  |  |
| 1 | 0 | 1 | STS-48c | 0 | 0 | 0 | UNEQ-P | O |  |  |  |  |  |
|  |  |  |  |  |  | 1 | STS-1 | O |  |  |  |  |  |
|  |  |  |  |  | 1 | 0 | STS-3c | O |  |  |  |  |  |
|  |  |  |  |  | 1 | 1 | STS-12c | O |  |  |  |  |  |
|  |  |  |  | 1 | 0 | 0 | STS-24c | O |  |  |  |  |  |
|  |  |  |  | 1 | 0 | 1 | STS-48c | O |  |  |  |  |  |
|  |  |  |  | 1 | 1 | X | STS-1 | O |  |  |  |  |  |
| 1 | 1 | X | STS-1 | 0 | 0 | 0 | UNEQ-P |  |  |  |  | O |  |
|  |  |  |  |  |  | 1 | STS-1 |  |  |  |  | O |  |
|  |  |  |  |  | 1 | 0 | STS-3c |  |  |  | O |  |  |
|  |  |  |  |  | 1 | 1 | STS-12c |  |  | O |  |  |  |
|  |  |  |  | 1 | 0 | 0 | STS-24c |  | O |  |  |  |  |
|  |  |  |  | 1 | 0 | 1 | STS-48c | O |  |  |  |  |  |
|  |  |  |  | 1 | 1 | X | STS-1 |  |  |  |  | O |  |

B →

CROSS-CONNECT METHOD AND CROSS-CONNECT APPARATUS

BACKGROUND OF THE INVENTION (1) Field of the Invention

The present invention relates to a cross-connect method and a cross-connect apparatus suitable for use with a synchronous digital hierarchy (SDH) transmission system.

(2) Description of the Related Art

A ring network (hereinafter sometimes simply referred to as a "ring") generally comprises a plurality of node devices (SDH transmission devices) connected together by means of high-speed transmission paths (for work and for protection).

Each of the node devices constituting the ring network [for example, an add-and-drop multiplexer (ADM)] is arranged so as to be able to receive a signal sent from another low-speed network of a lower hierarchical level by way of a low-speed transmission path and to add the signal to a high-speed transmission path (transmission path for work) so as to transmit the signal to another node device connected to the ring; to permit a signal—which is transmitted from another node device connected to the ring by way of the high-speed transmission path—to pass through to another node device; and to drop a signal to a low-speed network by way of a low-speed transmission path and through employment of drop control. An SDH frame of a higher-order group is transmitted over a high-speed transmission path provided in the ring network, and a signal received from a lower hierarchical level is inserted into a payload of the SDH frame.

In the field of the ring network, there has been conceived a uni-directional protection switched ring (UPSR) which, in the event of a failure in a transmission path over which a signal is transmitted from a certain node device, can switch a transmission path to another transmission path by means of automatic path switching (APS) control, as if the failure had not occurred.

In the UPSR-type ring network, identical signals are transmitted to a high-speed transmission path for work (hereinafter often referred to simply as a "path-for-work") and a high-speed transmission path for protection (hereinafter often referred to simply as a "path-for-protection"), and a receiving apparatus monitors the quality of the signals (i.e., line quality) transmitted over the respective paths and, by means of a path switch, selectively outputs the signal having better quality.

In contrast with the UPSR-type ring network, there has been conceived a ring network of bi-directional line switched ring (BLSR) type. In the BLSR-type ring network, a signal is transmitted to the path-for-work at the time of normal operation. However, in the event of a failure, the signal which is being transmitted to the path-for-work is also transmitted to the path-for-protection.

In the BLSR-type ring network, a service selector of a receiving node device selects a signal—which is transmitted over the path for work—at the time of normal operation but selects a signal—which is transmitted over the path for protection—in the event of a failure, thus switching the transmission path between the path-for-work and the path-for-protection.

As mentioned above, the UPSR-type ring network and the BLSR-type ring network are now available. There has already been conceived a network system which is equipped with both the path switch and the service selector and which is compatible with both the ring UPSR-type network and the BLSR-type ring network.

For instance, a node device 10-1 shown in FIG. 11 is arranged so as to be compatible with both the UPSR-type ring network and the BLSR-type ring network. As shown in FIG. 11, the node device 10-1 comprises time slot assignment sections (TSA) 10-1$a$, 10-1$b$, and 10-1$c$; a path switch (PSW) 10-1$d$; a time slot interchange (TSI) section 10-1$e$; and service selectors (S.S) 10-1$f$ and 10-1$g$.

In the node device 10-1, the TSA sections 10-1$a$ and 10-1$b$ (soft switch) and the path switch (hard switch) change the path over which a signal is dropped from a line. After having been subjected to path switching operation, the signal is reduced in capacity to one-half as large as that of before cross-connect operation (i.e., soft switch).

The TSI section (cross-connect apparatus and soft switch) 10-1$e$ and the service selectors 10-1$f$ and 10-1$g$ (hard switch) subject to service selector processing a signal added to the line or a signal passed therethrough, with the result that the signal is reduced in capacity to half that before the service selector processing.

The TSA sections 10-1$a$ to 10-1$c$ and the TSI section 10-1$e$ perform operations only through line setting (soft switch) by means of software. As shown in FIG. 11, in a case where a hard switch, such as the path switch 10-1$d$ or the service selectors 10-1$f$ and 10-1$g$, is used, selection of the data on which a cross-connect operation has been performed (or that have been subjected to protection switching by use of a hard switch) is executed in connection with both a signal transmitted over the path for work and a signal transmitted over the path for protection.

In this case, the TSI section 10-1$e$ performs a cross-connect operation on a received signal and transmits the thus-received signal to the service selectors 10-1$f$ and 10-1$g$. In some cases, the signal on which a cross-connect operation has been performed is not selected by the service selectors 10-1$f$ and 10-1$g$. Further, the PSW 10-1$d$ is arranged to select a signal output from either the TSA 10-1$a$ or the TSA 10-1$b$ and outputs the thus-selected signal. A redundant configuration enables a cross-connect operation on a signal which is not output from the PSW 10-1$d$, the signal selector 10-1$f$, or the signal selector 10-1$g$, thereby raising a problem of excessive power consumption.

SUMMARY OF THE INVENTION

The present invention has been conceived in view of the above-described problem, and the object of the present invention is to provide a cross-connect method and a cross-connect apparatus, both of which apply a cross-connect operation in place of a function of the hard switch that has conventionally been used for a purpose other than a cross-connect operation, by selection of line setting information used for path switching or service selection and by changing a cross-connect operation through use of the line setting information signal, thereby preventing redundant configuration of the cross-connect apparatus.

The present invention provides a cross-connect method for performing a cross-connect operation on a main signal which includes a signal transmitted over a path for work and a signal transmitted over a path for protection, and the method comprising a step of retaining line setting information required for the cross-connect operation and a step of controlling the cross-connect operation of the main signal based on the line setting information, wherein the cross-connect operation is controlled in such a manner that one of the path-for-work signal and the path-for-protection signal is to be selectively output.

According to the cross-connect method, the cross-connect control is performed in the step of controlling in a way so as to select the signal of better quality from the path-for-work signal transmitted over the path-for-work and the path-for-protection signal transmitted over the path-for-protection, based on the line setting information retained in the step of retaining. The function of the hard switch that has conventionally been used for a purpose other than cross-connect operation can be applied to cross-connect operation, thereby preventing redundant configuration of the cross-connect apparatus and diminishing power consumption.

Further, the present invention provides a cross-connect apparatus which comprises a cross-connect section for a cross-connect operation on a main signal that includes a path-for-work signal transmitted over a path for work (hereinafter referred to simply as a "path-for-work signal") and a path-for-protection signal transmitted over a path for protection (hereinafter referred to simply as a "path-for-protection signal"), a memory section for retaining line setting information required for the cross-connect operation and a cross-connect control section for controlling the cross-connect operation performed by the cross-connect section. The cross-connect control section is configured so as to control the cross-connect operation performed in the cross-connect section such that one of the path-for-work signal and the path-for-protection signal is selectively output.

In the cross-connect apparatus according to the present invention, the cross-connect control section controls the cross-connect operation of the cross-connect section so as to select the signal of better quality from the path-for-work signal and the path-for-protection signal, through use of the line setting information retained in the memory section, thus diminishing power consumption.

BRIEF DESCRIPTION OF THE DRAWINGS

FIG. 8 is a table for describing determination of a received code performed by the selector control section according to one embodiment of the present invention;

FIGS. 9(a) to 9(e) are tables for describing definitions used by the selector control section for perceiving the code of concatenation according to one embodiment of the present invention;

FIG. 10 is a table for describing determination of concatenation performed by the selector control section according to one embodiment of the present invention.

DESCRIPTION OF THE PREFERRED EMBODIMENTS (a) Aspects of the Present Invention A cross-connect method according to the present invention comprises a step of retaining line setting information required for a cross-connect operation and a step of controlling the cross-connect operation of a main signal based on the line setting information in such a manner that one of a path-for-work signal transmitted over a path-for-work and a path-for-protection signal transmitted over a path-for-protection is to be selectively output.

Under the cross-connect method according to the present invention, the cross-connect control is performed in the step of controlling in a way so as to select a signal of better quality from the signal transmitted over the path for work and the signal transmitted over the path for protection based on the line setting information. The function of the hard switch that has conventionally been used for a purpose other than a cross-connect operation can be applied to cross-connect operation, thereby preventing redundant configuration of the cross-connect apparatus and diminishing power consumption.

The aspect of the present invention will now be described by reference to the accompanying drawings.

Figure 1:
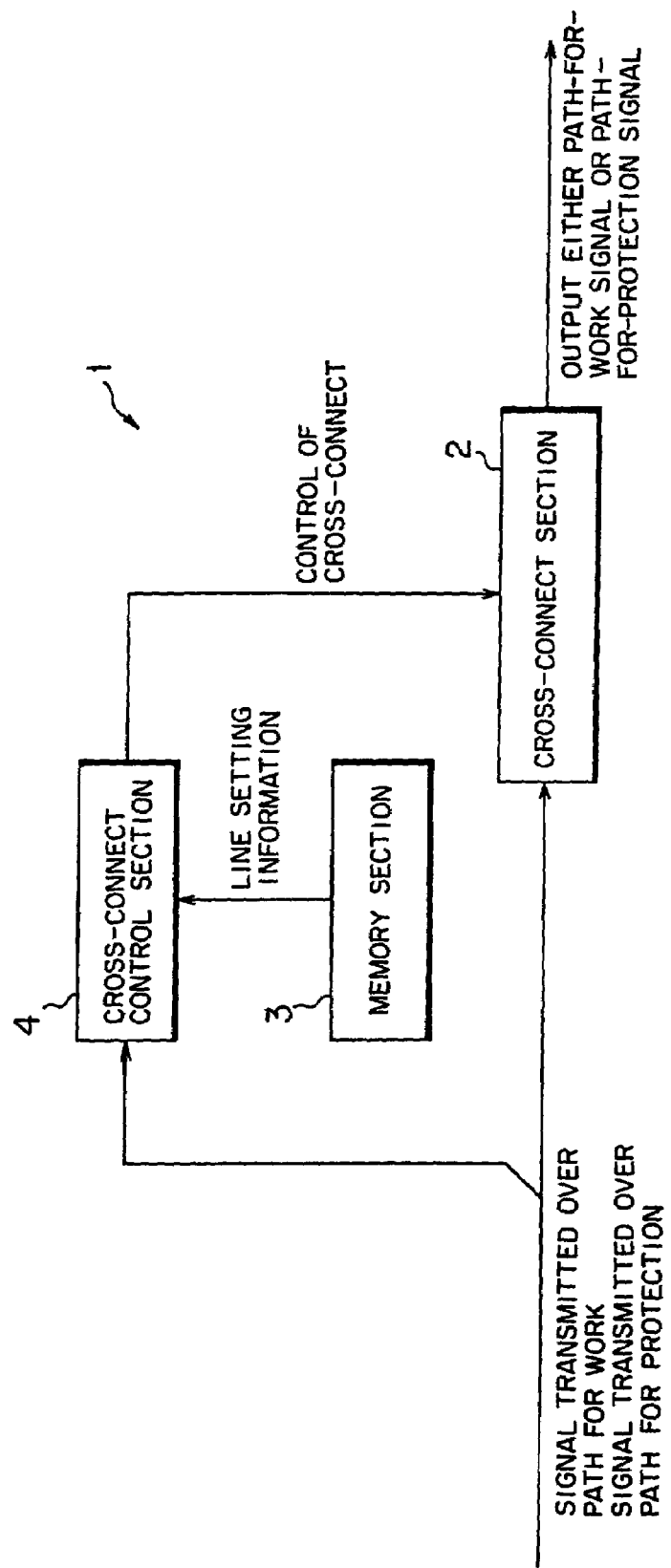
FIG. 1 is a block diagram showing an aspect of the present invention.

FIG. 1 is a block diagram showing the aspect of the present invention. In FIG. 1, a cross-connect apparatus 1 comprises a cross-connect section 2 for performing a cross-connect operation on a main signal including a signal transmitted over a path for work (hereinafter referred to simply as a "path-for-work signal") and a signal transmitted over a path for protection (hereinafter referred to simply as a "path-for-protection signal"), a memory section 3 for retaining line setting information required for performing the cross-connect operation and a cross-connect control section 4 for controlling the cross-connect operation performed in the cross-connect section 2. The cross-connect control section 4 is configured so as to control the cross-connect operation performed in the cross-connect section 2 such that one of the path-for-work signal and the path-for-protection signal is selectively output.

In the cross-connect apparatus 1 according to the present invention, the cross-connect control section 4 controls the cross-connect operation of the cross-connect section 2 so as to select the signal of better quality from the path-for-work signal and the path-for-protection signal through use of the line setting information retained in the memory section 3, thus diminishing power consumption.

The cross-connect control section 4 further comprises an alarm detection section for detecting alarm information from the signal; an alarm information cross-connect section for performing a cross-connect operation on the alarm information which has been detected by the alarm detection section based on the line setting information retained in the memory section 3; and a switch control section for generating, based on the alarm information performed by the alarm information cross-connect section, a selection information specifying which one of the path-for-work signal and said path-for-protection signal should be selected for output. The cross-connect section 2 may also be arranged to control cross-connect operation of the cross-connect section 2 based on the selection information output from the switch control section.

In the cross-connect apparatus 1 according to the present invention, the alarm information cross-connect section performs cross-connect operation on the alarm information detected by the alarm detection section to the line setting information retained in the memory section 3, and based on the selection information specifying which of the path-for-work signal or the path-for-protection signal is selected, the switch control section controls cross-connect operation, thus preventing redundant cross-connect processing of the main signal and hence diminishing power consumption.

The alarm detection section may also be arranged to encode the detected alarm information in accordance with a predetermined priority. The switch control section may also be arranged to generate selection information through use of the encoded alarm information on which the cross-connect operation has been performed by the alarm information cross-connect section.

In the cross-connect apparatus 1 according to the present invention, the alarm detection section encodes the detected alarm information in a predetermined priority. The switch control section outputs selection information through use of the encoded alarm information on which the cross-connect operation has been performed by the alarm information cross-connect section. Consequently, the cross-connect apparatus 1 can interface only the important alarm information, thereby avoiding complication of the interface and realizing a simplified cross-connect apparatus.

The cross-connect control section 4 may also be equipped with a concatenation information detection section for detecting concatenation information relating to combination of header data and subsequent data, and a concatenation information cross-connect section for performing a cross-connect operation on the concatenation information which has detected by the concatenation information detection section in accordance with the line setting information retained in the memory section 3. The switch control section may also be configured to generate selection information based on the concatenation information as the result of the cross-connect operation of the concatenation information cross-connect section and the alarm information as the result of the cross-connect operation of the alarm information cross-connect section.

In the cross-connect apparatus according to the present invention, the concatenation information cross-connect section performs cross-connect operation on the concatenation information which has been detected by the concatenation information detection section according to the line setting information retained in the memory section 3. Based on the concatenation information on which the cross-connect operation has been performed by the concatenation information cross-connect section and the alarm information on which the cross-connect operation has been performed by the alarm information cross-connect section, the switch control section outputs selection information. As a result, concatenation switching control can be performed immediately, thereby diminishing a signal loss and immediately performing alarm switching operation through concatenation.

In addition, the concatenation information detection section may be arranged to encode the detected concatenation information. Further, the switch control section may also be arranged to generate selection information, based on the concatenation information which has been encoded by the concatenation information detection section and on which the cross-connect operation has been performed by the concatenation information cross-connect section.

In the cross-connect apparatus 1 according to the present invention, the concatenation information detection section encodes the detected concatenation information, and the switch control section outputs selection information through use of the concatenation information which has been encoded by the concatenation information detection section and on which the cross-connect operation has been performed by the concatenation information cross-connect section, thereby avoiding complication of an interface and realizing a simplified cross-connect apparatus.

Desirably, the cross-connect control section 4 is arranged to subject the subsequent data of the concatenation information to execute the same cross-connect control as the header data.

In the cross-connect apparatus 1 according to the present invention, the cross-connect control section 4 also subjects the subsequent data to execute the same cross-connect control as the header data. Consequently, concatenation switching control can be performed immediately, thereby diminishing a signal loss and immediately performing alarm switching operation.

(b) Description of an Embodiment of the Present Invention

An example of the present invention will be described by reference to the accompanying drawings.

An embodiment of the present invention will now be described by reference to the accompanying drawings.

Figure 2:
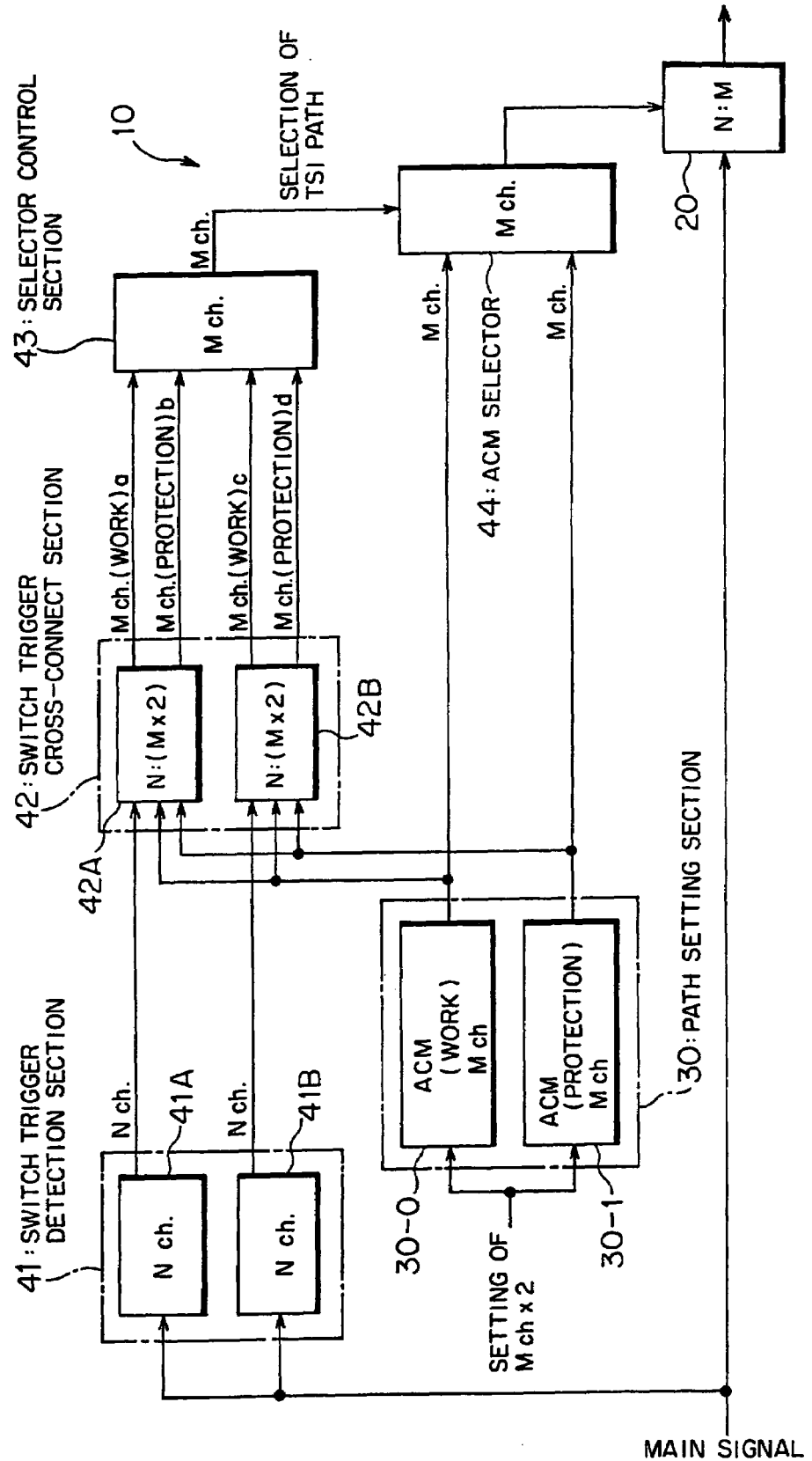
FIG. 2 is a block diagram showing a cross-connect apparatus according to one embodiment of the present invention.

FIG. 2 is a block diagram showing a cross-connect apparatus according to one embodiment of the present invention. A cross-connect apparatus 10 shown in FIG. 2 performs a cross-connect operation on a signal having N (N is an integer) input channels to a (main) signal having M (M is an integer) output channels and performs path switching and service selecting operations for selecting the signal of better quality from the path-for-work signal and the path-for-protection signal, and outputting the thus-selected signal. The relationship between the number of input channels N and the number of output channels M is dependent on the setting of the cross-connect apparatus or the network performed by a maintenance engineer and is defined as N=M or N>M.

As shown in FIG. 2, the cross-connect apparatus 10 comprises a main signal TSI section 20, a path setting section 30, a switch trigger detection section 41, a switch trigger cross-connect section 42, a selector control section 43, and an ACM selector 44. The following explanation will be based on the assumption that the main signal is transmitted in the form of an STS-12c frame; that signals for 12 channels are superimposed on one frame; and that the cross-connect apparatus 10 outputs N/12 SDH transmission frames (STS-12c) as M/12 frames.

The main signal TSI section (cross-connect section) 20 performs a cross-connect operation on the main signal included in each SDH transmission frame (hereinafter often referred to simply as an "SDH frame" or a "transmission frame") for each channel to a desired output channel based on the line setting information output from the path setting section 30.

Symbol "N:M" shown in FIG. 2 denotes that the main signal TSI section 20 outputs M channels in response to inputs of N channels.

The switch trigger detection section 41 detects trigger information representing a timing for performing path switching and a timing for performing service selection processing and detects concatenation information and alarm information as trigger information.

As shown in FIG. 2, the switch trigger detection section 41 comprises a concatenation detection section 41A and an alarm detection section 41B.

The concatenation detection section (or concatenation information detection section) 41A detects concatenation information representing that a main signal included in an SDH frame of high-order group is formed by combination of header data and subsequent data. Based on an "H1" byte and an "H2" byte included in a section overhead(SOH) of the SDH frame, the concatenation detection section 41A detects concatenation information and outputs the thus-detected concatenation information after the information has been encoded into a predetermined code such as that provided in Table 1 below.

TABLE 1

ENCODING EXAMPLES

| CONCATENATION CODE (CONC CODE) | CONCATENATION SIZE STATUS |
| --- | --- |
| 000 | UNEQ (Unequipped) |
| 001 | STS-1 |
| 010 | STS-3c |
| 011 | STS-12c |
| 100 | STS-24c |
| 101 | STS-48c |
| 110 | STS-1 (Protection)* |
| 111 | STS-1 (Protection)* |

Symbol "*" provided in Table 1 depicts a code which is not set. Further, symbol "000" (UNEQ) represents, for example, concatenation information output to a channel whose line is not set. Accordingly, in the cross-connect apparatus 10, upon receipt of N/12 STS-12c frames, the concatenation detection section 41A detects "011."

Figures 3A, 3B:
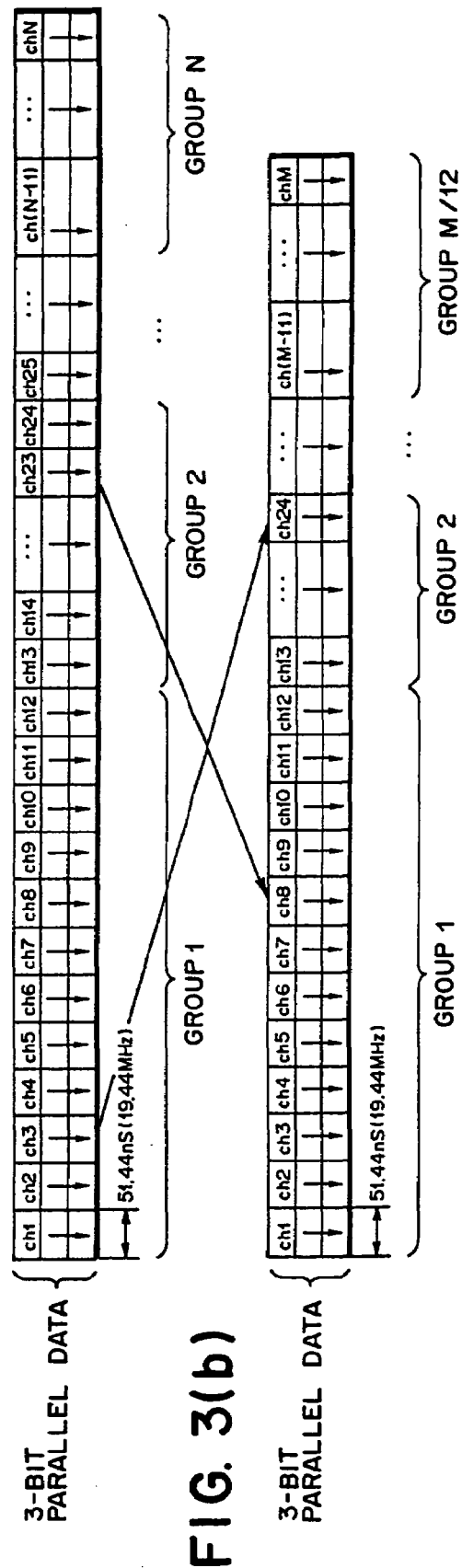
FIG. 3(a) is a schematic representation showing an example of data output from a concatenation detection section.
FIG. 3(b) is a schematic representation showing an example of data output from a concatenation TSI section.

FIG. 3(a) represents an example of data output from the concatenation detection section 41A. As shown in FIG. 3(a), the concatenation detection section 41A outputs a code regarding a concatenation size for each channel, in the form of 3 bits of parallel data (i.e., 3 bits of data shown in the left-side column of Table 1 are output in parallel).

For instance, when the cross-connect apparatus 10 receives the STS-12c frame, parallel data output for each channel shown in FIG. 3(a) assume the value "011."

Groups 1, 2, ... N shown in FIG. 3(a) show that STS-12c frames are collected in groups of 12 channels so as to correspond to the number of channels (12) assigned to one STS-12c frame. Unless otherwise specified, the label "GROUP" provided in other drawings is also used in the same sense.

The alarm detection section 41B detects alarm information from a received main signal. In the present embodiment, the alarm detection section 41B encodes the thus-detected alarm information in accordance with a predetermined priority such as that shown in Table 2 and outputs the thus-encoded data. Alarm information may be AIS-P (STS Path Alarm Indication Signal), UNEQ-P (STS Path Unequipped), PLM-P (STS Path Payload Label Mismatch), PDI-P (STS Path Payload Defect Indication), B3 Major (B3 Bit Error Ratio Major Alarm), or B3 Minor (B3 Bit Error Ratio Minor Alarm).

AIS-P represents an alarm for an STS path level and is determined by detecting that both the "H1" and "H2" bytes of a line overhead assume the value "1." UNEQ-P represents that a line for the STS payload has not yet been set (i.e., a state in which data have not been transmitted) and are determined by detecting that all "C2" bytes in the path overhead assume the value "0."

PLM-P represents that the format of data included in the STS payload do not match the format information set in hardware which processes the signal. PLM-P is determined by comparison between "C2" byte information set in the hardware for processing the signal and a "C2" byte included in the path overhead of the payload.

PDI-P represents the number of errors in the data included in the STS payload. The number of errors is encoded, and the thus-encoded number is included in the "C2" byte of the path overhead. PDI-P is determined by the corresponding code.

B3 Major and B3 Minor each represent the probability of detection of BIP (bit interleaved parity) errors in the data included in the STS payload. A frequency at which errors are detected ranges from $10^{-3}$ to $10^{-9}$. B3 Major designates data determined to be within the range from $10^{-3}$ to $10^{-6}$, and B3 Minor designates data determined to be outside the range (i.e., within a range over $10^{-9}$).

(Examples of Encoded Alarm Information are Shown in the Next Page)

TABLE 2

EXAMPLES OF ENCODED ALARM INFORMATION

| PRIORITY | ALARM CODE | RECEIVED ALARM STATUS |
| --- | --- | --- |
| TOP | 11111 | AIS-P/UNEQ/PLM-P(EXCLUSIVE OR RESULT) |
|  | 11110 | B3 Major |
|  | 11101 | PDI-P (Received "$FC_H$" code) |
|  | 11100 | PDI-P (Received "$FB_H$" code) |
|  | 11011 | PDI-P (Received "$FA_H$" code) |
|  | 11010 | PDI-P (Received "$F9_H$" code) |
|  | 11001 | PDI-P (Received "$F8_H$" code) |
|  | 11000 | PDI-P (Received "$F7_H$" code) |
|  | 10111 | PDI-P (Received "$F6_H$" code) |
|  | 10110 | PDI-P (Received "$F5_H$" code) |
|  | 10101 | PDI-P (Received "$F4_H$" code) |
|  | 10100 | PDI-P (Received "$F3_H$" code) |
|  | 10011 | PDI-P (Received "$F2_H$" code) |
|  | 10010 | PDI-P (Received "$F1_H$" code) |
|  | 10001 | PDI-P (Received "$F0_H$" code) |
|  | 10000 | PDI-P (Received "$EF_H$" code) |
|  | 01111 | PDI-P (Received "$EE_H$" code) |
|  | 01110 | PDI-P (Received "$ED_H$" code) |
|  | 01101 | PDI-P (Received "$EC_H$" code) |
|  | 01100 | PDI-P (Received "$EB_H$" code) |
|  | 01011 | PDI-P (Received "$EA_H$" code) |
|  | 01010 | PDI-P (Received "$E9_H$" code) |
|  | 01001 | PDI-P (Received "$E8_H$" code) |
|  | 01000 | PDI-P (Received "$E7_H$" code) |
|  | 00111 | PDI-P (Received "$E6_H$" code) |
|  | 00110 | PDI-P (Received "$E5_H$" code) |
|  | 00101 | PDI-P (Received "$E4_H$" code) |
|  | 00100 | PDI-P (Received "$E3_H$" code) |
|  | 00011 | PDI-P (Received "$E2_H$" code) |
|  | 00010 | PDI-P (Received "$E1_H$" code) |
|  | 00001 | B3 Minor |
| LOW | 00000 | Normal |

Priorities provided in Table 2 signify that the lower the priority, the better the quality. If a line is not set for the received main signal, the signal is assigned alarm code "11111" (where the output UNEQ is determined to be identical with UNEQ-P of the alarm status).

Figures 4A, 4B:
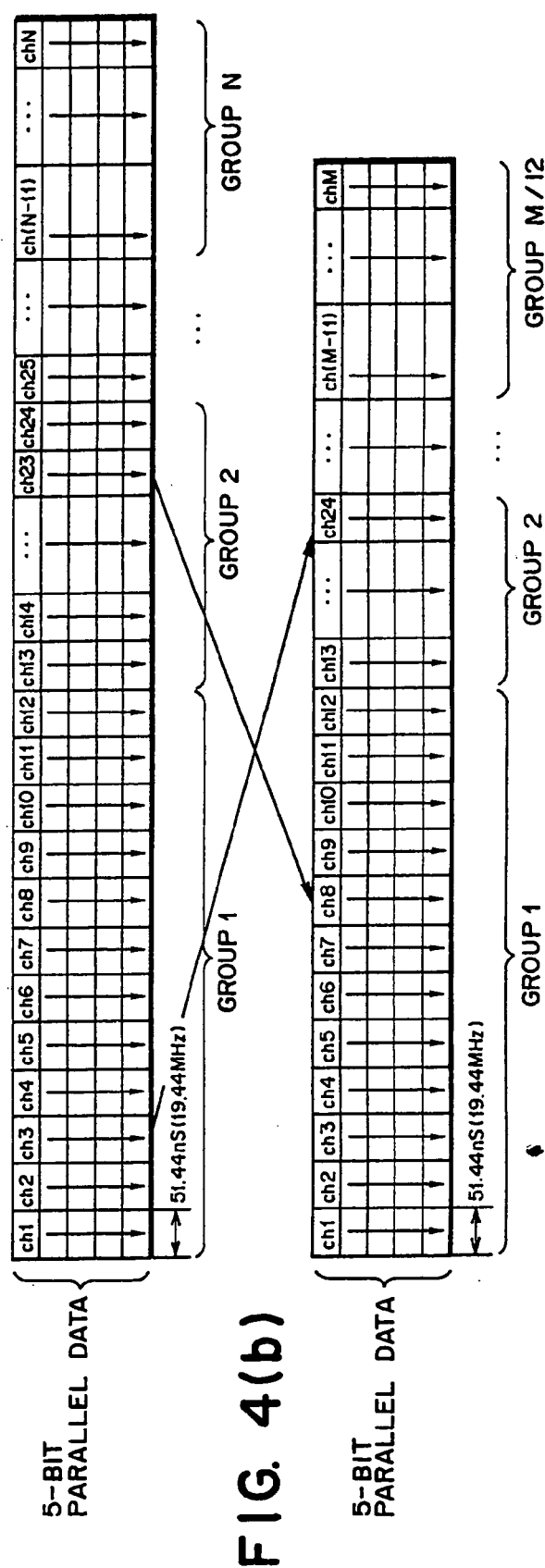
FIG. 4(a) is a schematic representation showing an example of data output from an alarm detection section.
FIG. 4(b) is a schematic representation showing an example of data output from an alarm TSI section.

FIG. 4(a) shows data output from the alarm detection section 41B. As shown in FIG. 4(a), the alarm detection section 41B outputs alarm information for each channel in the form of 5 bits of parallel data [5 bits of data (alarm code) provided in the left-side column of Table 2 are output in parallel].

The path setting section (memory section) 30 retains line setting information required for the cross-connect operation performed by the main signal TSI section 20. The line setting information is provided for the path-for-work and the path-for-protection. In order to perform "N:M" cross-connect operation, the path setting section 30 is given a register (memory) corresponding to "2M" output channels.

More specifically, as shown in FIG. 2, the path setting section 30 is provided with ACM (address control memory) sections 30-0 and 30-1. The ACM section 30-0 retains line setting information for each channel of the path-for-work (labeled "WORK" in FIG. 2), and the ACM section 30-1 retains line setting information for each channel of the path-for-protection (labeled "PROTECTION" in FIG. 2).

For example, the line setting information corresponds to information representing a linkage between an output channel and an input channel and is used for linking input channels "I" (I=1 to N) to output channels "J" (J=1 to M). The line setting information is sent to a switch trigger cross-connect section 42 and a selector control section 43 from each of the ACM section 30-0 and the ACM section 30-1.

Figure 5:
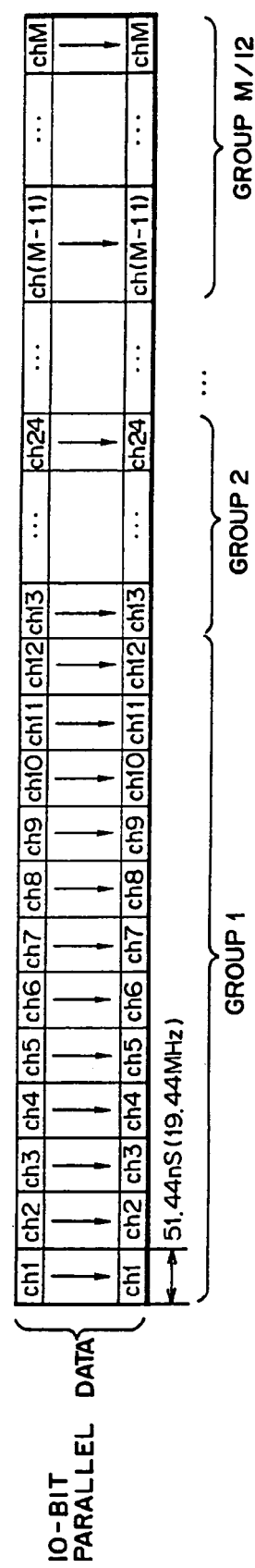
FIG. 5 is a schematic representation showing an example of line setting information output from an ACM according to one embodiment of the present invention.

FIG. 5 shows line setting information output from the ACM section 30-0. As shown in FIG. 5, the ACM section 30-0 is arranged to output line setting information for each channel in the form of 10 bits of parallel data. The line setting information for each channel is output from the ACM section 30-0 to each of a concatenation TSI section 42A and an alarm TSI section 42B, which will be described later.

Channel numbers (ch1 to chM) shown in FIG. 5 represent channels on which cross-connect operation has been performed (i.e., output channels). 10 bits of parallel data output for each output channel represent a channel before cross-connect operation is performed (i.e., an input channel). Accordingly, the line setting information for each channel shown in FIG. 5 is output, for each output channel, in the form of 10 bits of parallel data which represent an input channel (of the path-for-work) linked to the output channel.

The line setting information, which is output from the ACM section 30-1 to the concatenation TSI section 42A and the alarm TSI section 42B (both of which will be described later), is also output for each channel in the form of 10 bits of parallel data, in the same manner as that in which the line setting information is output from the ACM section 30-0 shown in FIG. 5. The line setting information output from the ACM section 30-1 for each output channel also represents an input channel (of the path-for-protection) linked to the output channel.

Figure 6:
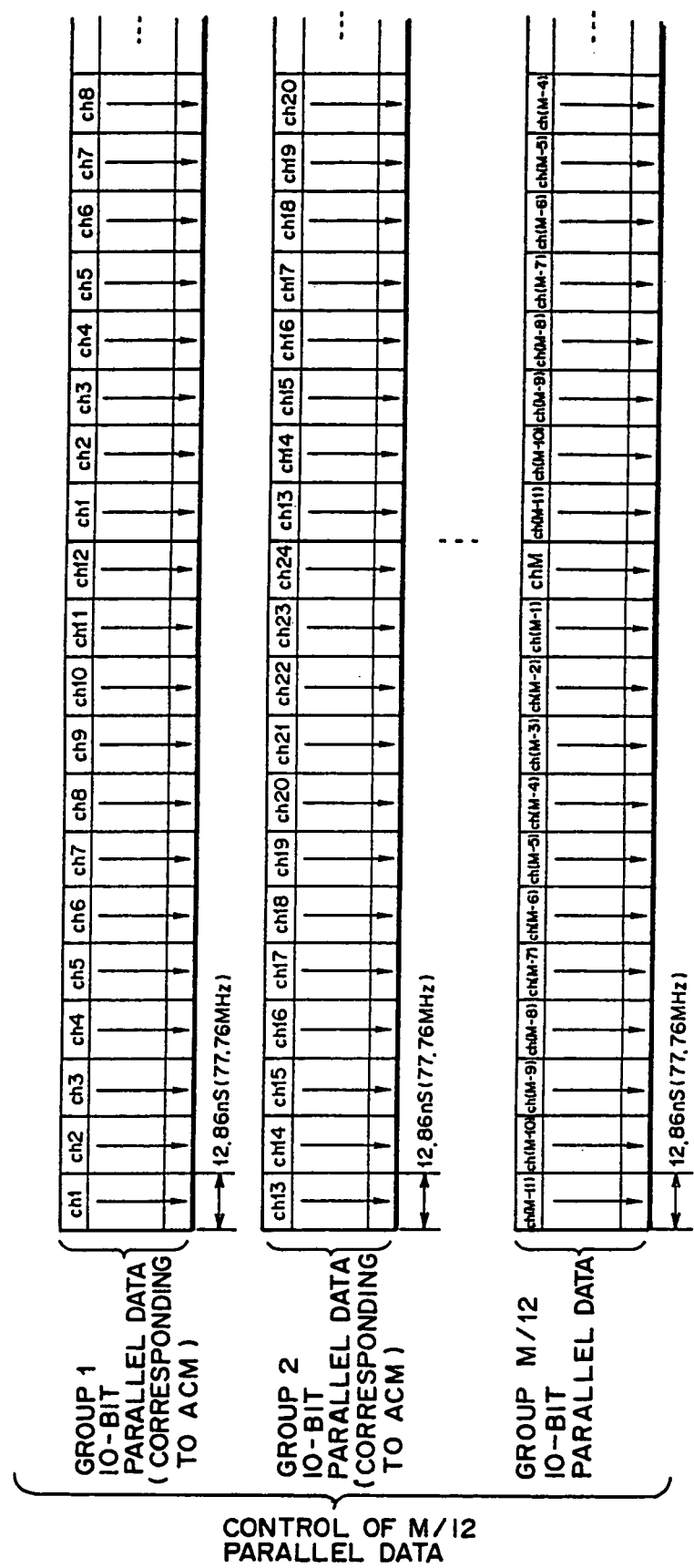
FIG. 6 is a schematic representation showing an example of line setting information output from the ACM to an ACM selector according to one embodiment of the present invention.

FIG. 6 shows an example of line setting information output to the ACM selector 44 from the ACM section 30-0. As shown in FIG. 6, for each channel, 10 bits of parallel data are output to the ACM selector 44 from the ACM section 30-0. The configuration of the parallel data is not specifically shown in FIG. 6, and channel numbers (ch1 to chM) shown in FIG. 6 represent channels on which a cross-connect operation has been performed (i.e., output channels). As in the case of the line setting information (i.e., 10 bits of parallel data) shown in FIG. 5, 10 bits of parallel data output for each channel represent an input channel (of the path-for-work) linked to the output channel.

The line setting information output from the ACM section 30-1 to the ACM selector 44 is also output for each channel in the form of 10 bits of parallel data, as in the case of the line setting information output from the ACM 30-0 shown in FIG. 6, thereby outputting information representing the input channel (of the path-for-protection) linked to the output channel.

At the time of setting of a line, the maintenance engineer for the cross-connect apparatus controls an unillustrated apparatus so as to set and store the line setting information in the ACM sections 30-0 and 30-1.

According to the line setting information (see FIG. 5) stored in the path setting section 30, the switch trigger cross-connect section 42 performs a cross-connect operation on trigger information detected by the switch trigger detection section 41. More specifically, the switch trigger cross-connect section 42 performs, according to the line setting information retained in the ACM 30-0 and ACM 30-1, a cross-connect operation on the concatenation information and the alarm information in the same manner as the main signal TSI section 20 has performed the cross-connect operation. For example, in a case where the main signal TSI section 20 performs a cross-connect operation on the input channel "I" to the output channel "J," cross-connect operations on the concatenation information and the alarm information, both relating to the input channel "I," are performed to the output channel "J."

To this end, as shown in FIG. 2, the switch trigger cross-connect section 42 is provided with the concatenation TSI section 42A and the alarm TSI section 42B.

On the basis of the line setting information retained in the path setting section 30, the concatenation TSI section (concatenation information cross-connect section) 42A performs a cross-connect operation on the concatenation information detected by the concatenation detection section 41A, thereby separately outputting to the selector control section 43 the encoded concatenation information relating to the path-for-work and the encoded concatenation information relating to the path-for-protection.

FIG. 3(b) shows an example of data output from the concatenation TSI section 42A. The output data shown in FIG. 3(b) are output separately to the selector control section 43 as output data relating to the path-for-work and output data relating to the path-for-protection.

For example, based on the line setting information transmitted from the ACM section 30-0 (see FIG. 5), the concatenation TSI section 42A performs cross-connect operation on concatenation information of N input channels (see FIG. 3(a)) transmitted from the concatenation detection section 41A, thus outputting the data to the selector control section 43 as concatenation information [labeled "Mch (WORK)" in FIG. 2] for the path-for-work.

Label "N: (M×2)" provided in the concatenation TSI section 42A shown in FIG. 2 represents that after the concatenation TSI section 42A has performed a cross-connect operation on a code for N channels transmitted from the concatenation detection section 41A, a code for M-channels for the path-for-work and a code for M-channels for the path-for-protection are output.

For example, provided that an input channel (ch3) is used as the path-for-work and that the main signal TSI section 20 performs a cross-connect operation on the input channel (ch3) to an output channel (ch24), the concatenation TSI section 42A performs a cross-connect operation on concatenation information (3 bits of parallel data) relating to the detected input channel (i.e., ch3) to the output channel (ch24), as shown in FIGS. 3(a) and 3(b).

At this time, based on the line setting information held in the ACM section 30-1, the concatenation TSI section 42A performs a cross-connect operation on concatenation information corresponding to the N input channels (see FIG. 3(a)), thus outputting to the selector control section 43 concatenation information for the path-for-protection [labeled "Mch (PROTECTION)b" in FIG. 2].

For example, provided that the input channel (ch23) is used for the path-for-protection and the main signal TSI section 20 performs a cross-connect operation on the input channel (ch23) to the output channel (ch8), the concatenation TSI section 42A performs a cross-connect operation on the concatenation information (3 bits of parallel data) relating to the detected input channel (ch23) to the channel (ch24), as shown in FIGS. 3(a) and 3(b).

Next, based on the line setting information retained in the path setting section 30, the alarm TSI section (alarm information cross-connect section) 42B performs a cross-connect operation on the alarm information detected by the alarm detection section 41B, thereby separately outputting to the selector control section 43 coded alarm information for the path-for-work and coded alarm information for the path-for-protection.

FIG. 4(b) shows an example of data output from the alarm TSI section 42B. The output data shown in FIG. 4(b) are separately output to the selector control section 43 as output data for the path-for-work and output data for the path for protection. Further, label "N: (M×2)" provided in the alarm TSI section 42B shown in FIG. 2 represents that after the alarm TSI section 42B has performed a cross-connect operation on a code for N channels transmitted from the alarm detection section 41B, a code for M-channels for the path-for-work and M-channels for the path for protection are output.

More specifically, on the basis of the line setting information transmitted from the ACM section 30-0 (see FIG. 5), the alarm TSI section 42B cross-connects the alarm information which are transmitted from the alarm detection section 41B and correspond to the N input channels (see FIG. 3(a)), thus outputting to the selector control section 43 as the alarm information for the path-for-work [labeled "Mch (WORK) c" in FIG. 2].

For example, provided that the input channel (ch3) is used for the path-for-work and the main signal TSI section 20 performs a cross-connect operation on the input channel (ch3) to the output channel (ch24), the alarm TSI section 42B performs a cross-connect operation on the alarm information (5 bits of parallel data) relating to the detected input channel (ch3) to the channel (ch24), as shown in FIGS. 4(a) and 4(b).

Based on the line setting information for the path-for-protection (information for use with the path-for-protection corresponding to that shown in FIG. 5) retained in the ACM section 30-1, the alarm TSI section 42B performs a cross-connect operation on the alarm information corresponding to N input channels (see FIG. 4(a)), thereby outputting the information to the selector control section 43 as alarm information for the path-for-protection [labeled "Mch (PROTECTION)d" shown in FIG. 2].

For example, provided that the input channel (ch23) is used as the path-for-protection and that the main signal TSI section 20 performs a cross-connect operation on the input channel (ch23) to the output channel (ch8), the alarm TSI section 42B performs a cross-connect operation on the alarm information (5 bits of parallel data) relating to the detected input channel (ch23) to the output channel (ch8).

Next, based on the alarm information on which a cross-connect operation has been performed by the alarm TSI section 42B and the concatenation information on which a cross-connect operation has been performed by the concatenation TSI section 42A, the selector control section (switch control section) 43 outputs information for determining (selection information) which of the path-for-work signal and the path-for-protection signal is selected.

Further, the selector control section 43 is also arranged to switch the path switching operation and the service selection operation according to the priority of the alarm, as well as to determine a direction in which switching is performed, based on the setting performed by software. The switching operation and the determination of the switching direction are performed on the basis of two sets of information items corresponding to two channels (i.e., the path-for-work and the path-for-protection) which are input for each channel, each information set comprising alarm information and concatenation information.

Based on these information items, the selector control section 43 performs hard switching and soft switching, thus outputting selection information.

Specifically, the selector control section 43 compares the alarm information items relating to two input channels linked to one output channel and compares the codes (binary codes, and refer to Table 2) transmitted from the alarm TSI section 42B as alarm information, thereby selecting from the path-for-work signal and the path-for-protection signal the signal whose alarm information has a lower priority.

For example, when "AIS-P" is detected for the work (the path-for-work) and "B3 Minor" is detected for the protection (the path-for-protection) from two respective input channels linked to the output J channel, the selector control section 43 outputs to the ACM selector 44 selection information representing that the work channel should be selected for the line setting information relating to the output J channel, so that a main signal of protection can be output to the main signal TSI section 20.

Figure 7:
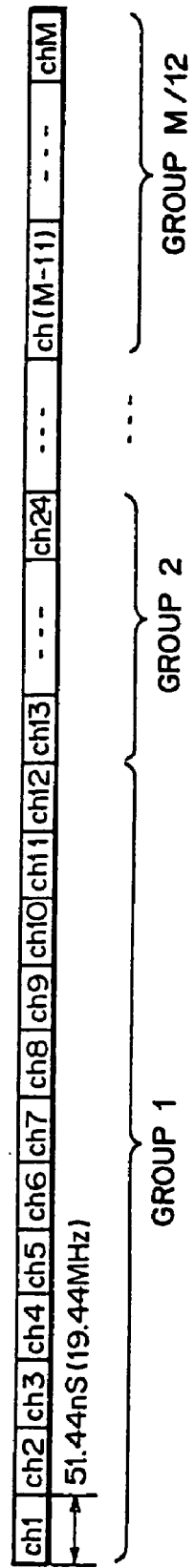
FIG. 7 is a schematic representation showing an example of selection information output from a selector control section to the ACM selector according to one embodiment of the present invention.
Figure 11:
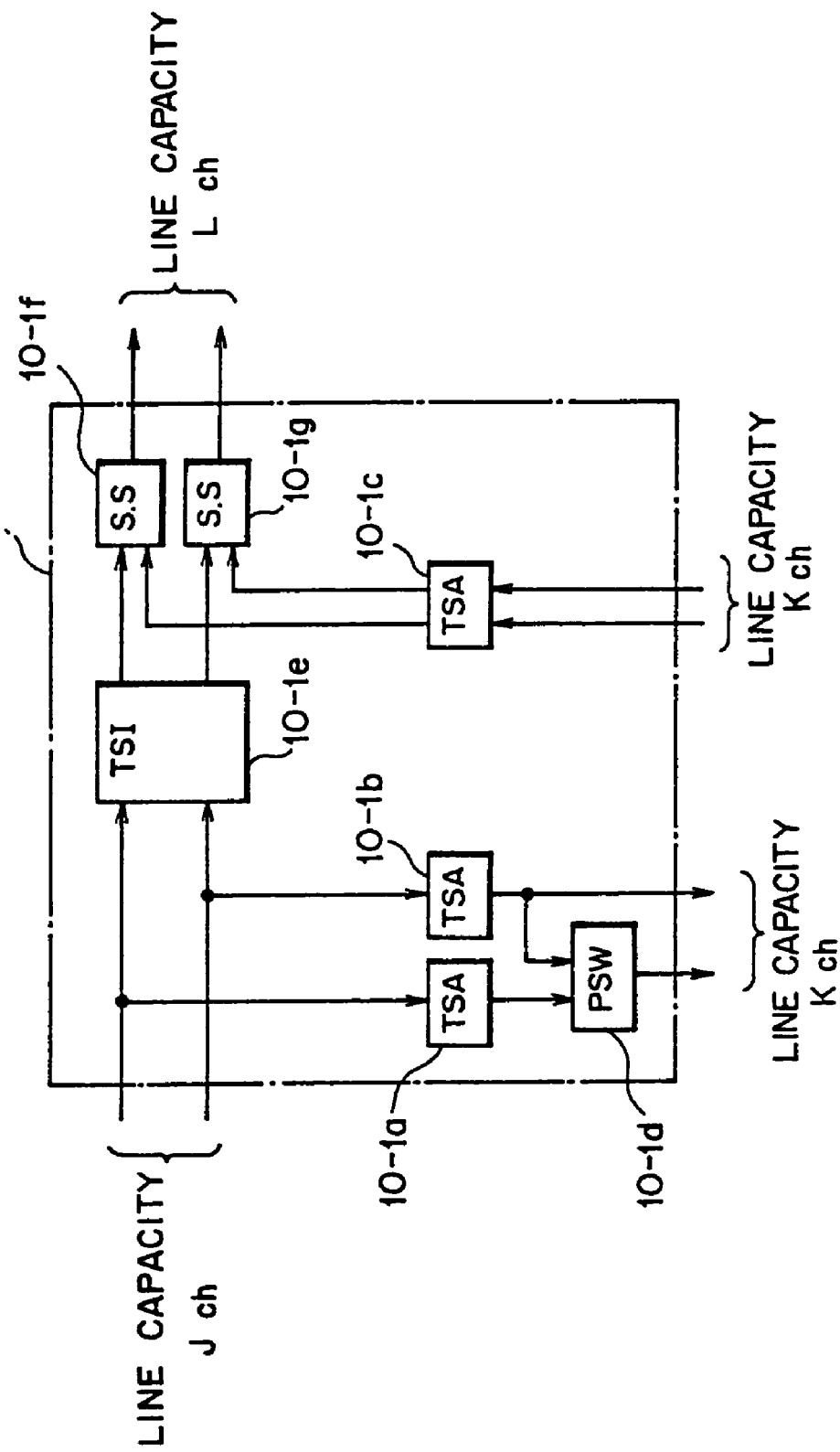
FIG. 11 is a block diagram showing one example of configuration of a node device compatible with both a UPSR-type ring network and a BLSR-type ring network.

FIG. 7 shows an example of selection information output from the selector control section 43 to the ACM selector 44. The channel numbers shown in FIG. 7 represent output channels of the main signal TSI section 20, and the selection information is output to the ACM selector 44 for each output channel. In the present embodiment, for each output channel, one bit of data; that is, either "0" representing that the path-for-work signal should be output or "1" representing that the path-for-protection signal should be output, are output as a selection signal.

Based on the concatenation information transmitted from the concatenation TSI section 42A, the selector control section 43 is also arranged so as to perform concatenation operation. At the time of execution of the concatenation operation, the selector control section 43 determines whether or not a code appropriate for concatenation information relating to the path-for-work and a code appropriate for concatenation information relating to the path-for-protection have been received.

FIG. 8 is a diagram for describing a determination made by the selector control section 43 as to a received code. FIG. 8 shows the relationship between header data and subsequent data which are joined through concatenation. In the main signal TSI section 20, a maximum of 12 signals (included in the STS-12c frame) can be input per slot. Handling a STS-48c frame requires four slots. As shown in FIG. 8, the following description is based on the assumption that the main signal TSI section 20 has a transmission capacity of eight slots.

Since the cross-connect apparatus 10 handles an STS-12c frame, the subsequent channels (ch2 to ch12) are subordinate to a header channel (ch1), as indicated by arrow A 12c shown in FIG. 8.

In the selector control section 43, only the header channel (ch1) can receive the code for the STS-12c frame. If the selector control section 43 receives the code for the STS-12c frame over any other channel, the thus-received code is disregarded. Further, a determination is made as to whether or not the concatenation code of the received code is correct.

FIGS. 9(a) to 9(e) are diagrams for describing the definition used by the selector control section 43 for identifying the concatenation code. Upon receipt of a concatenation size set by the maintenance engineer for the network or the cross-connect apparatus 10, the selector control section 43 identifies the concatenation code according to the definition shown in FIG. 9(a).

When receiving concatenation information whose size is greater than the preset concatenation size, the selector control section 43 handles the thus-received concatenation information as STS-1 for each channel. In a case where the concatenation size is set to the size of the STS-12c frame, if the selector control section detects concatenation information that is greater in size than the STS-12c frame, the concatenation information is handled as STS-1.

For example, if the selector control section 43 detects a code of STS-24c or STS-48c in spite of the fact that the concatenation size of the header channel is set to STS-12c, the thus-detected code is handled as STS-1 (labeled "C" in FIG. 9(c)), as shown in FIG. 9(c).

The selector control section 43 compares the concatenation code for the path-for-work with the concatenation code for the path-for-protection, both being transmitted from the concatenation TSI section 42A, and acknowledges a concatenation code of greater capacity as being the concatenation code for the current channel.

FIG. 10 is a table for describing determination of concatenation made by the selector control section 43, showing selection of a concatenation code in the case where the selector control section 43 receives concatenation codes of different capacities. On the basis of the information shown in FIG. 10, the selector control section 43 determines the capacity of the concatenation code.

For example, if the selector control section 43 detects a concatenation code (STS-1) from EAST and another concatenation code (STS-12c) from WEST with regard to a certain output channel, as indicated by arrow B shown in FIG. 10, the concatenation code (STS-12c) is selected (as indicated by a circle designated by arrow B in FIG. 10).

The term "EAST" provided in FIG. 10 designates either the path-for-work or the path-for-protection. If the signal received over EAST is a path-for-work signal, the term "WEST" corresponds to a path-for-protection signal. Further, "SS" shown in FIG. 10 represents service selection, and "PSW" represents path switching.

When receiving an appropriate concatenation code of the header channel, the selector control section 43 outputs the same selection information as that of the header channel to subsequent channels without comparing alarm information items (i.e., concatenation operation).

For example, when the selector control section 43 outputs selection information "0" to the output channel (ch1) shown in FIG. 7, selection information "0" of the header channel (ch1) is duplicated and output to the subsequent channels (ch2 to ch12).

Based on the selection information transmitted from the selector control section 43, the ACM selector 44 selects the line setting information items transmitted from the ACM sections 30-0 and 30-1.

Based on the selection information (see FIG. 7) transmitted from the selector control section 43, for each channel the ACM selector 44 selects line setting information from the line setting information items received from the ACM section 30-0 and the ACM section 30-1 and sends the thus-selected line setting information to the main signal TSI section 20.

Selection information which is shown in FIG. 7 and is formed from one bit for each channel is used when the ACM selector 44 selects the line setting information for the path-for-work or the line setting information for the path-for-protection. The ACM selector 44 converts the selection information—which is shown in FIG. 7 and is transmitted in a serial manner—to parallel data and selects line setting information. If selection information assumes the value "0," the line setting information for the path-for-work is selected. In contrast, if selection information assumes the value "1," line setting information for the path-for-protection is selected.

For example, if selection information of the output channel (ch1) shown in FIG. 7 assumes the value "1," the ACM selector 44 selects the line setting information transmitted from the ACM section 30-1 from the line setting information items which are transmitted from the ACM sections 30-0 and 30-1 and which represent input channels linked to the output channels.

The line setting information selected by the ACM selector 44 is again explained by reference to FIG. 6. The line setting information is output as M/12 parallel data and is used for controlling the main signal TSI section 20. More specifically, the line setting information transmitted for each output channel is used as a read address by the main signal TSI section 20 (i.e., the main signal TSI section 20 is controlled by means of M/12 parallel data).

In the cross-connect apparatus 10, a cross-connect control section is constituted of the concatenation detection section 41A, the alarm detection section 41B, the concatenation TSI section 42A, the alarm TSI section 42B, the selector control section 43, and the ACM selector 44. Through use of the line setting information retained in the path setting section 30, the cross-connect control section controls cross-connect operation performed by the main signal TSI section 20.

The operation of the cross-connect apparatus 10 having the foregoing configuration will now be described in connection with a case where SONET (synchronous optical network) frames of concatenation size 12c (including 12 channels) are received over the path-for-work and the path-for-protection and where a cross-connect operation to output channels (ch1 to ch12) is performed on the thus-received 24 input channels (path-for-works ranging from ch1 to ch12 and path-for-protections ranging from ch13 to ch24).

The signals which are transmitted to the cross-connect apparatus 10 as the path-for-work signal and the path-for-protection signal are sent to the main signal TSI section 20, as well as to the switch trigger detection section 41.

In the switch trigger detection section 41, the concatenation detection section 41A detects concatenation information from the section overhead of the received main signal and converts the thus-detected concatenation information into a predetermined code. The predetermined code is then sent to the concatenation TSI section 42A.

More specifically, the concatenation detection section 41A detects STS-12c from "H1" and "H2" bytes from the section overhead of each of the received path-for-work signal and the path-for-protection signal, thus outputting concatenation information "011" shown in Table 1 (see FIG. 3(a)).

With regard to the input channels (ch1 to ch12) the same concatenation information (i.e., "011") is output from the concatenation detection section 41A to the concatenation TSI section 42A in the form of a 3-bit parallel signal.

The alarm detection section 41B provided in the switch trigger detection section 41 detects alarm information from the received signal for each channel and converts the thus-detected alarm information into a predetermined code, thereby transmitting the predetermined code to the alarm TSI section 42B (see FIG. 4(a)).

Next, through use of the line setting information for the path-for-work transmitted from the ACM section 30-0 and the line setting information for the path-for-protection transmitted from the ACM section 30-1 (see FIG. 5), the alarm TSI section 42B performs a cross-connect operation on the alarm information (see FIG. 4(a)) transmitted from the alarm detection section 41B (see FIG. 4(b)).

As in the case of the cross-connect operation performed by the alarm TSI section 42B, through use of the line setting information shown in FIG. 5, the concatenation TSI section 42A performs a cross-connect operation on the concatenation information (see FIG. 3(a)) transmitted from the concatenation detection section 41A (see FIG. 3(b)).

Next, based on the concatenation information transmitted from the concatenation TSI section 42A and the alarm information transmitted from the alarm TSI section 42B, the selector control section 43 outputs to the ACM selector 44 selection information represents which of the line setting information for the path-for-work and the line setting information for the path-for-protection is selected.

According to the priority shown in Table 2, the selector control section 43 selects the signal of lower priority from the two signals transmitted from the alarm TSI section 42B and compares the concatenation information for the path-for-work with the concatenation information for the path-for-protection, both being transmitted from the concatenation TSI section 42A, thereby outputting as selection information the concatenation information of larger size or greater capacity.

When receiving concatenation information items, the selector control section 43 compares alarm information items, with regard to only the header channel (ch1). For example, if the selector control section 43 determines that the concatenation information for the path-for-protection should be selected, from the result of comparison between the header channel of the path-for-work signal and the header channel of the path-for-protection signal according to Table 2, "1" is output as selection information in relation to the header channel. Even to the channels (ch2 to ch12) subsequent to the header channel (ch1), there is output selection information "1" for selecting the line setting information for the path-for-protection.

At the time of comparison between concatenation information items, when receiving concatenation information whose size is greater than the preset concatenation size, the selector control section 43 handles the thus-received concatenation information as STS-1 for each channel (see FIG. 9(c)).

For example, in a case where the work concatenation information [in relation to output channels ch1 to ch12] transmitted from the concatenation TSI section 42A represents a code of STS-24c, the selector control section 43 handles the work output channels (ch1 to ch12) as STS-1. As a result of comparison of the size of the work concatenation information and the size of the protection concatenation information, STS-1 is found to be of greater size than STS-12c. Hence, STS-12c is selected (see FIG. 10), and selection information items equal in number to the channels included in STS-12c are output to the ACM selector 44.

Even in this case, the selector control section 43 compares alarm information items, with regard to only the header channel (ch1). When determining "1" as selection information in relation to the output channel (ch1), the selector control section 43 outputs "1" as selection information to the subsequent channels (ch2 to ch12).

Subsequently, on the basis of the selection information transmitted from the selector control section 43, for each channel the ACM selector 44 selects either the line setting information transmitted from the ACM section 30-0 or the line setting information transmitted from the ACM section 30-1, and outputs the thus-selected line setting information to the main signal TSI section 20.

More specifically, in a case where the selection information transmitted to the output channels (ch1 to ch12) from the selector control section 43 is "1," the ACM selector 44 selects the line setting information transmitted from the ACM section 30-1 and sends the line setting information to the main signal TSI section 20 (see FIG. 6). In this case, the ACM selector 44 selects the line setting information transmitted from the ACM section 30-1 as selection information in relation to the header channel (ch1) and the subsequent channels (ch2 to ch12) of the concatenation information and outputs the thus-selected selection information.

Based on the line setting information transmitted from the ACM selector 44, the main signal TSI section 20 performs a cross-connect operation on the input channels (ch13 to ch24) to the output channels (ch1 to ch12).

Even with regard to other input channels, the cross-connect apparatus 10 compares alarm information items, thereby performing a cross-connect operation on the input channels to output channels.

As mentioned above, in the cross-connect apparatus 10 according to the present invention, after a cross-connect operation having been performed, the main signals transmitted over the path-for-work and the path-for-protection are not subjected to path switching operation or service selection operation. Through use of line setting information for the path-for-work or the path-for-protection selected by the ACM selector 44 based on the selection information transmitted from the selector control section 43, the main signal TSI section 20 performs a cross-connect operation on only the path-for-work main signal or the path-for-protection main signal, thus performing path switching and service selection operations.

In the cross-connect apparatus 10, the function of the hard switch that has conventionally been used for a purpose other than cross-connect operations can be applied to a cross-connect operation, thereby preventing redundant configuration of the cross-connect apparatus and diminishing power consumption.

Further, in the cross-connect apparatus 10 according to the present invention, the alarm TSI section 42B performs a cross-connect operation on the alarm information detected by the alarm detection section 41B, according to the line setting information retained in the path setting section 30.

Based on the selection information representing which of the main signal output over the path-for-work and the main signal output over the path-for-protection is selected, the selector control section 43 controls the cross-connect operation of the main signal TSI section 20, with the result that redundant configuration of the cross-connect apparatus can be prevented and power consumption can be diminished.

In the cross-connect apparatus 10 according to the present invention, the alarm detection section 41B encodes the detected alarm information in the predetermined priority shown in Table 2. The selector control section 43 outputs selection information through use of the encoded alarm information on which a cross-connect operation has been performed by the alarm TSI section 42B. Consequently, the cross-connect apparatus 10 can interface only the important alarm information, thereby avoiding complication of the interface and realizing a simplified cross-connect apparatus.

In the cross-connect apparatus 10 according to the present invention, the concatenation TSI section 20 performs a cross-connect operation on the concatenation information detected by the concatenation detection section 41A according to the line setting information retained in the path setting section 30. Based on the concatenation information on which a cross-connect operation has been performed by the concatenation TSI section 42A and the alarm information on which a cross-connect operation has been performed by the alarm TSI section 42B, the selector control section 43 outputs selection information. As a result, concatenation switching can be performed immediately, thereby diminishing a signal loss and immediately performing alarm switching through concatenation.

In the cross-connect apparatus 10 according to the present invention, the concatenation detection section 41A encodes the detected concatenation information, and the selector control section 43 outputs selection information by use of a code encoded by the concatenation TSI section 42A, thereby avoiding complication of an interface and realizing a simplified cross-connect apparatus.

In the cross-connect apparatus 10 according to the present invention, with regard to a signal whose main data and subsequent data are multiplexed, the subsequent data are subjected to the same control as used for performing a cross-connect operation on the header data. Consequently, concatenation switching can be performed immediately, thereby diminishing a signal loss and immediately performing alarm switching.

In the cross-connect apparatus 10 according to one embodiment of the present invention, one group is handled as 12 channels (STS-12c). One group may be handled as, for example, 1 channel (STS-1), 3 channels (STS-3), 12 channels (STS-12c), 24 channels (STS-24c), 48 channels (STS-48c), or the like. In other words, various groups—which differ from one another in terms of the number of channels included in one group—are handled, and a cross-connect operation may be performed on a plurality of signals having different transmission capabilities.

For example, in consideration for input N channels, the cross-connect apparatus 10 may be arranged to be able to handle 48 channels of N channels as STS-48c, 24 channels as STS-24c, 6 channels as 2STS-3, and the like.

The maintenance engineer for the cross-connect apparatus or the ring network may set a rate at which a signal is input over an input channel of N input channels of the main signal TSI section 20 or a rate at which a signal is output over an output channel of M output channels.

The cross-connect apparatus 10 sends to the main signal TSI section 20 a signal transmitted over a low-speed transmission path as well as a signal transmitted over a high-speed transmission path. In the same manner as described previously, cross-connect operation is performed under control of the path setting section 30, the switch trigger cross-connect section 42, the selector control section 43, and the ACM selector 44.

In this case, since the cross-connect operation performed by the main signal TSI section 20 is different from that described previously, the line setting information held in the ACM sections 30-0 and 30-1 differ from the previously-described line setting information retained in the ACM sections 30-0 and 30-1.

The line setting information changes in various manners according to the settings performed by the maintenance engineer for the cross-connect apparatus or the network. Even in the cross-connect apparatus 10, there are performed a service selection operation and a path switching operation for selecting the main signal from the path-for-work main signal and the path-for-protection main signal and for outputting the thus-selected main signal. The concatenation code output from the concatenation detection section 41A of the switch trigger detection section 41 is performed a cross-connect operation by the concatenation TSI section 42A of the switch trigger cross-connect section 42 based on the line setting information held in the ACM section 30-0. Further, the alarm code output from the alarm detection section 41B of the switch trigger detection section 41 is performed a cross-connect operation by the alarm TSI section 42B on the basis of the line setting information held in the ACM section 30-1. This concatenation on which a cross-connect operation has been performed and alarm codes are output to the selector control section 43.

In this case, the line setting information output from the ACM section 30-0 shown in FIG. 5 to the concatenation TSI section 42A and the line setting information output from the ACM section 30-1 to the alarm TSI section 42B are written so as to output 12 channels per group. However, the number of channels to be output is not limited to 12 but may be 1, 24, or the like.

Similarly, FIG. 3(b) shows the code output from the concatenation TSI section 42A to the selector control section 43, and FIG. 4(b) shows the code output from the alarm detection section 42B to the selector control section 43. The label "GROUP" provided in FIGS. 3(b) and 4(b) is not limited to 12 channels.

Further, the selection information shown in FIG. 7 and the line setting information shown in FIG. 6 are not limited to 12 channels per group.

The cross-connect apparatus handles a plurality of signals which differ from one another in transmission rate. If the selector control section 43 receives a concatenation code of STS-48c over the channel which is set so as to receive a code of STS-24c, the thus-received code is identified as STS-1 (see FIG. 9(b)).

The selector control section 43 also perceives the received concatenation code through use of the data contained in the tables FIGS. 9(d) and 9(e).

The cross-connect apparatus 10 having the foregoing configuration yields the same advantageous results as those described above. Further, the cross-connect apparatus 10 enables a cross-connect operation of signals having various transmission rates within the maximum number of channels capable of being handled by the cross-connect apparatus, as well as a cross-connect operation of signals having a pre-designed transmission rate. As a result, the cross-connect apparatus can be applied to various networks and can contribute to improving configuration of a network.

The present invention may be implemented in the form of various embodiments other than that which has been previously described in detail, so long as the embodiments fall within the scope of the invention.

What is claimed is:

1. A cross-connect method for performing a cross-connect operation on a main signal including a working channel signal transmitted over a working path and a protection channel signal transmitted over a protection path, said method comprising the steps of:
   retaining line setting information required for the cross-connect operation;
   detecting trigger information, causing a selection of one of the working path and the protection path, for an individual channel signal from said main signal;
   cross-connecting trigger information pieces detected for the individual channel signal according to said retained line setting information; and
   controlling the cross-connect operation on the main signal based on said retained line setting information and the cross-connected trigger information pieces so that one of the working channel signal and the protection channel signal is selectively output under the cross-connect operation for the main signal, whereby said cross connect operation is shared for cross-connecting based on retained line setting information and selective outputting of either said working channel signal or said protection channel signal.

2. A cross-connect apparatus comprising:
   a main signal cross-connect section for performing a cross-connect operation on a main signal including a working channel signal transmitted over a working path and a protection channel signal transmitted over a protection path;
   a memory section for retaining line setting information required for the cross-connect operation;
   a trigger information detecting section for detecting trigger information, causing a selection of one of the working path and the protection path, for an individual channel signal from said main signal;
   a trigger information cross-connect section for cross-connecting trigger information pieces detected by said trigger information detecting section for the individual channel signal according to the line setting information; and
   a cross-connect control section for controlling the cross-connect operation of the main signal cross-connect section, based on said retained line setting information of the memory section and the trigger information cross-connected by the trigger information cross-connect section so that one of the working channel signal and the protection channel signal is selectively output under the cross-connect operation of the main signal cross-connect section, wherein said cross connect operation is shared for cross-connecting based on retained line setting information and selective outputting of either said working channel signal or said protection signal.

3. A cross-connect apparatus according to claim 2, wherein said trigger information detecting section includes:
   an alarm detection section for detecting alarm information as the trigger information for the individual channel signal in the main signal; and
   an alarm information cross-connect section for cross-connecting alarm information pieces, detected by said alarm detection section, based on said line setting information retained in said memory section; and said cross-connect control section includes:
   a switch control section for generating selection information for selectively outputting the working signal or the protection signal under the main signal cross-connect operation, based on the line setting information and the cross-connected alarm information by said alarm information cross-connect section for outputting said selection information,
   said cross-connect operation for the main signal being operable to perform the main signal cross-connect operation based on said selection information output from said switch control section, wherein said cross connect operation is shared for said cross-connecting based on retained line setting information and selective outputting of either said working channel or said proton channel signal.

4. A cross-connect apparatus according to claim 3, wherein said alarm detection section encodes said detected alarm information in accordance with a predetermined priority, and said switch control section generates said selection information based on said encoded alarm information.

5. A cross-connect apparatus comprising:
   a main signal cross-connect section for performing a cross-connect operation on a main signal including a working channel signal transmitted over a working path and a protection channel signal transmitted over a protection path;
   a memory section for retaining line setting information required for the cross-connect operation; and
   a cross-connect control section for controlling the cross-connect operation of the main signal cross-connect section, based on said line setting information so that one of the working channel signal and the protection channel signal is selectively output under the cross-connect operation of the main signal cross-connect section,
   wherein said cross-connect control section includes:
   an alarm detection section for detecting alarm information in the main signal; and
   an alarm information cross-connect section for cross-connecting the alarm information, detected by said alarm detection section, based on said line setting information retained in said memory section; and
   a switch control section for generating selection information specifying which one of the working signal and the protection signal should be selected for output under the main signal cross-connect operation, based on the line setting information and the cross-connected alarm information by said alarm information cross-connect section for outputting said selection information,
   said cross-connect operation for the main signal being operable to perform the main signal cross-connect operation based on said selection information output from said switch control section, and
   wherein said cross-connect control section further includes:
   a concatenation information detection section for detecting concatenation information relating to a combination of header data and subsequent data in the main signal; and
   a concatenation information cross-connect section for performing said cross-connect operation on said concatenation information, which has been detected by said concatenation information detection section, in accordance with said line setting information retained in the memory section, said switch control section being operable to generate selection information, based on said concatenation information as the result of the cross-connect operation of said concatenation information cross-connect section and said alarm information as the result of the cross-connect operation of said alarm information cross-connect section.

6. A cross-connect apparatus according to claim 5, wherein said concatenation information detection section encodes said concatenation information detected by said concatenation information detection section, and said switch control section generates said selection information, based on said concatenation information, which has been encoded by said concatenation information detection section and on which the cross-connect operation has been performed by said concatenation information cross-connect section.

7. A cross-connect apparatus according to claim 5, wherein the cross-connect control section subjects said subsequent data of said concatenation information to execute the same cross-connect control as said header data of said concatenation information.

* * * * *